United States Patent [19]
Leow

[11] Patent Number: 6,118,372
[45] Date of Patent: Sep. 12, 2000

[54] METHOD OF SIDE ILLUMINATION FOR PASSENGER CARS

[75] Inventor: Von Tat Leow, Ipoh, Malaysia

[73] Assignee: Reka Cipta Innovasi Sdn Bhd, Ipoh, Malaysia

[21] Appl. No.: 09/276,394

[22] Filed: Mar. 25, 1999

[30] Foreign Application Priority Data

Apr. 3, 1998 [MY] Malaysia .................. PI 9801492

[51] Int. Cl.⁷ ............................................ B60Q 1/26
[52] U.S. Cl. ....................... 340/468; 340/471; 340/472
[58] Field of Search .................. 340/468, 469, 340/471, 472, 428, 436, 463; 362/61

[56] References Cited

U.S. PATENT DOCUMENTS

| | | | |
|---|---|---|---|
| 4,972,173 | 11/1990 | Raciti | 340/468 |
| 5,017,903 | 5/1991 | Krippelz, Sr. | 340/468 |
| 5,497,304 | 3/1996 | Caine | 340/469 |
| 5,828,299 | 10/1998 | Chen | 340/468 |

*Primary Examiner*—Brent Swarthout
*Attorney, Agent, or Firm*—Merchant & Gould P.C.

[57] ABSTRACT

The present invention relates generally to a method of side illumination for passenger cars in which the side illumination is activated only when the light level received by a light receiving means such as a light dependent resistor (LDR) is below a pre-set value. The side illuminations are operable in four modes. A first mode is, equipped with a timer feature, operable on either or both sides of the car whenever a car door is opened. A second mode is activated whenever the car is reversing. A third mode, equipped with a timer, is activated on both sides of the car, whenever the centrally locking door is changed from a locked position to an unlocked position. A fourth mode on either or both sides of the car is activated whenever a switch is selected.

8 Claims, 11 Drawing Sheets

LEFT SIDE "SIDE ILLUMINATION SYSTEM" SIDE LIGHT

FIG. 1

FIG. 2A(iii)

METHOD OF SIDE ILLUMINATION FOR PASSENGER CARS

TECHNICAL FIELD

The present invention relates generally to a method of side illumination for passenger cars, particularly when any door is opened or unlocked, or when the car is reversing, or whenever a need arises.

BACKGROUND

A modern passenger car is equipped with parking lights, headlights or low beam control, back-up or reverse lights, courtesy lights, instrument panel lights, engine compartment light, and truck or load compartment light. Long-range headlights (halogen), or halogen-fog lights, or fog tail light can be added optionally for improved vision and safety while driving under adverse lighting conditions.

The main disadvantages of the prior art illumination are that they are restricted strictly either for internal illumination or external front and back illumination. It is evident that the prior art illumination arrangement does not provide for side illumination. In this connection, reversing is tough for most drivers, particularly in congested and poorly lit places. It could be assisted, if the side visibility is enhanced somewhat. This need therefore gives rise to the present invention.

SUMMARY OF THE INVENTION

It is the main object of this invention to provide a method of side illumination which is incorporated into the electrical system of a passenger car. According to the teachings of the invention, the side illumination method will be activated or de-activated automatically by a light operated switch. When the light level outside the car is bright enough according to a pre-set value of the device, the invention cannot be activated. When the light level is below the pre-set value, the invention is then activated and placed on standby. In other words, the invention is only operable when it is dark. This would prevent unnecessary illumination when it is otherwise bright, thus saving energy.

The method of illumination includes a first mode of illumination on either or both sides of a car whenever the car door is opened, as in the case when a passenger is alighting and making an exit. The first mode is equipped with a timer feature. A second mode of illumination is activated when the car is reversing. A third mode of illumination on both sides of the car is activated whenever the centrally locking door is changed from the locked position to the unloaded position. The third mode is also equipped with a timer feature. A fourth mode of illumination on either or both sides of a car is activated whenever a switch on the dashboard is selected.

These together with other objects and advantages will become apparent following the disclosure of the following description and claims. Reference is made to the accompanying drawings.

BRIEF DESCRIPTION OF THE DRAWINGS

FIG. 2b shows a logic diagram of the circuit diagram as shown in FIG. 2a.

FIG. 3a shows an embodiment of a light dependent resistor (LDR) and WELCOME input circuit being a part of the system circuit as shown in FIG. 2a.

FIG. 3b shows an embodiment of a supply circuit being a part of the system circuit as shown in FIG. 2a.

FIG. 3c shows an embodiment of an EXIT illumination timer circuit being a part of the system circuit as shown in FIG. 2a.

FIG. 3d shows an embodiment of a timer circuit for the LDR and WELCOME input circuit being a part of the system circuit as shown in FIG. 2a.

FIG. 3e shows an embodiment of an output driver circuit being a part of the system circuit as shown in FIG. 2a.

DETAILED DESCRIPTION

Figure 1:
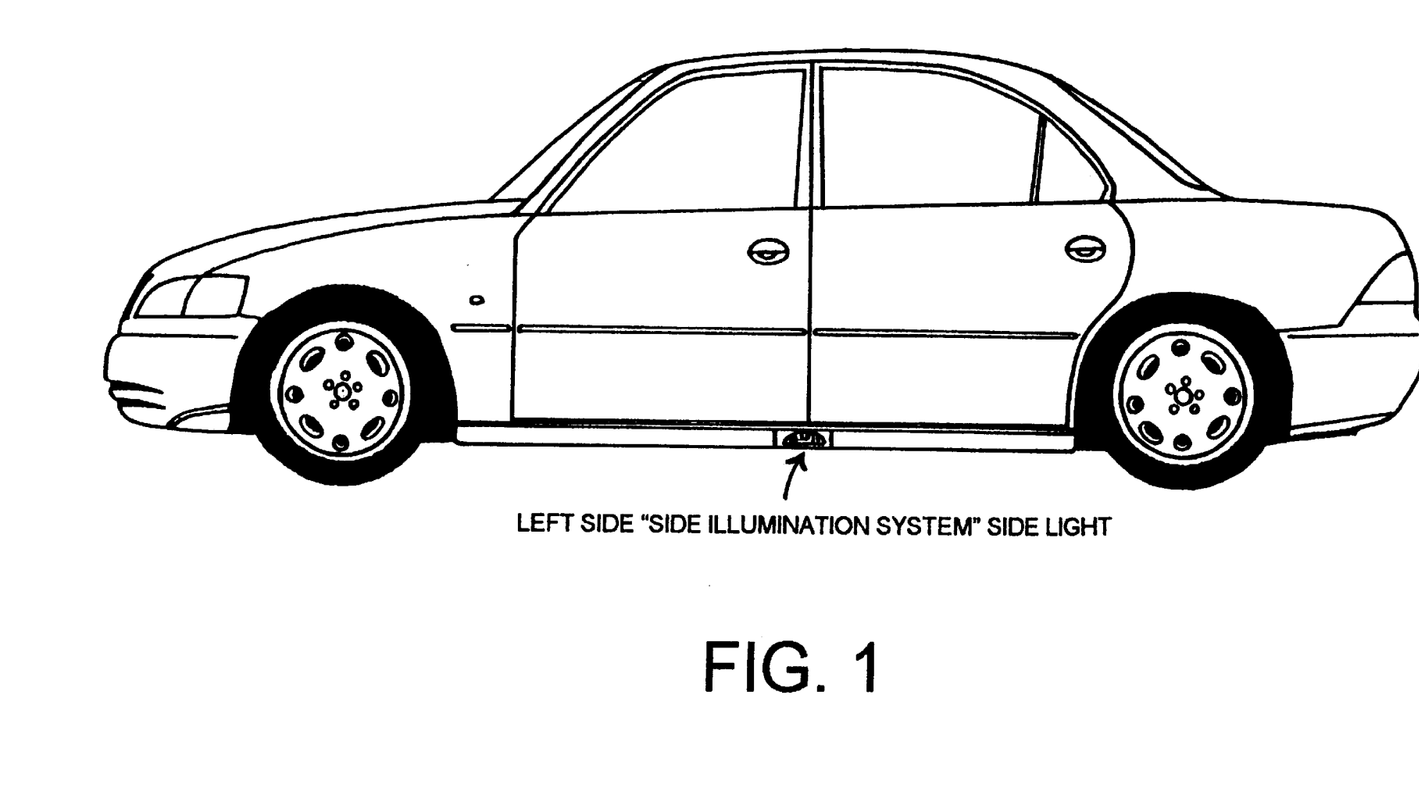
FIG. 1 shows a left side-view of a passenger car equipped with a side light provided according to the invention.

According to the invention, each side light is suitably mounted below and between the front and rear doors of a car, as shown in FIG. 1. A 3W 12V bulb is recommended. This side light is advantageously made detachable. In this particular instance, the side light can be provided with a magnetic base such that it can be attached to most metallic surface. With a length of electrical wiring, the side light is detached and made portable. After use, this light can be re-mounted to its original position with automatic cord rewind.

The two side lights are connectable to an electrical circuitry comprising various resistors R, capacitors C, diodes D, transistors TR and integrated circuits IC.

IC 3 (type 4050B) is used for interfacing the CMOS IC and the rest of the TTL logic input. IC 2 (type 40106 BE Schmitt trigger) is used to eliminate contact bounce. The circuit is connected to the permanent positive of the car battery. As shown in FIG. 3e, IC 13 (type 75451) serves as an output driver and is used to allow both the light bulbs to be controlled by 5V TTL output (IC 5 pin 2 and pin 4). Whenever the output pin 2 is in a logic state [0], the right side light is on, and when the output pin 4 is in logic state [0], the left side light will be switched on.

Figure 2A:
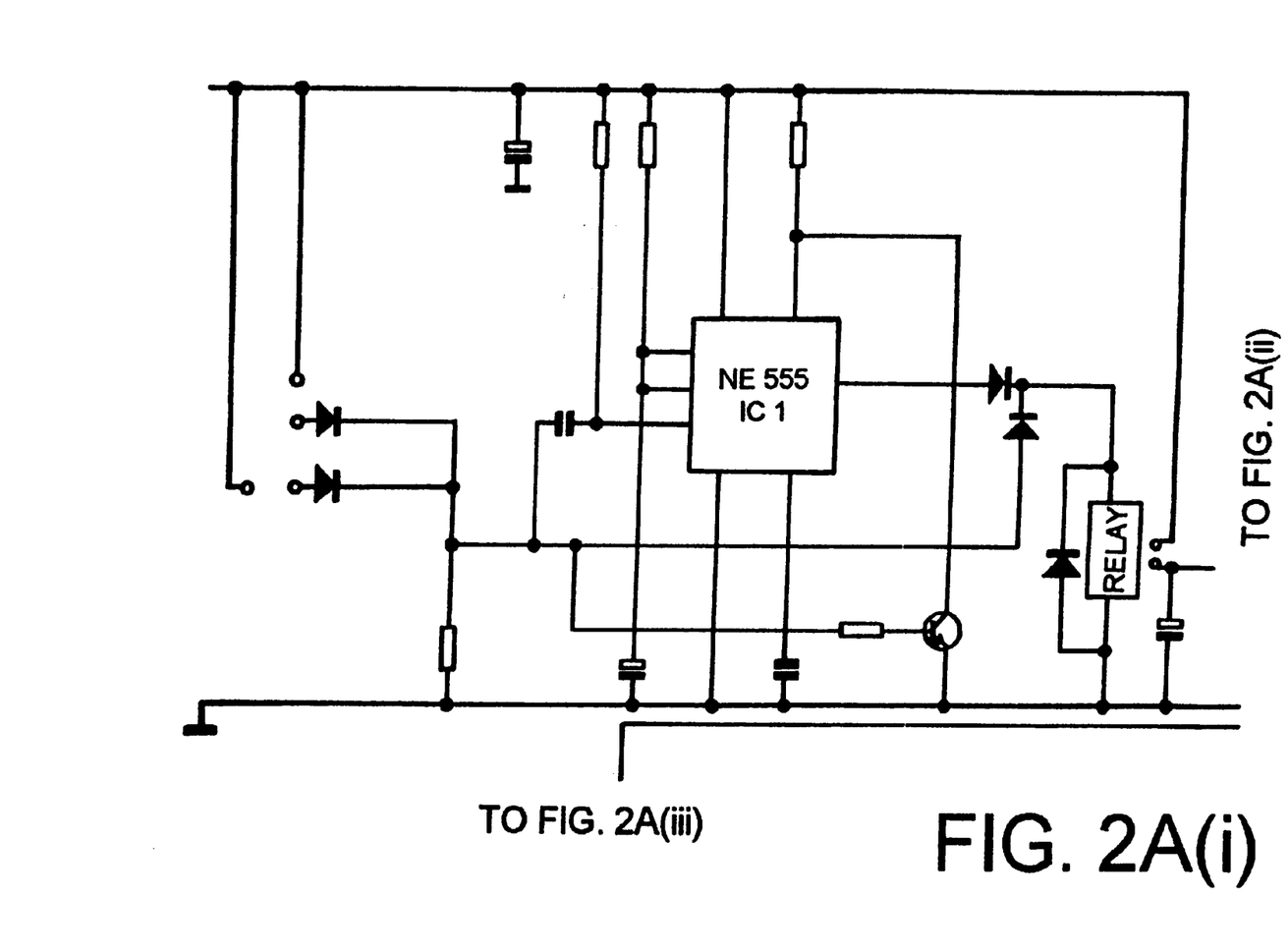
FIG. 2a shows an embodiment of a system circuit providing the four illumination modes according to the invention.

Referring to FIG. 2a, there are essentially two circuits, which the Applicant called the supply circuit and the control circuit. The side illumination will be activated or deactivated automatically by a light operated switch. When the light level outside the car is bright enough according to a pre-set value on a light dependent resistor (LDR), the invention cannot be activated. When the light level is below the pre-set value, the invention is then activated and placed on standby.

The control circuit has eight inputs from several switches:

1) one supply switch placed next to the door knob of the left front door (representing the input A),
2) one WELCOME switch on the door knob of the right front door (representing the input J),
3) one double pole double throw switch next to the ignition keyhole (representing the engine/ignition inputs B/I),
4) four door switches on the four door frames (representing the door inputs C and D),
5) one reverse switch placed next to the reverse gear (representing the reverse input E),
6) one HELP switch placed on the dashboard (representing the on call HELP input F),
7) one left side switch placed on the left signal lever (representing the input G),
8) one right side switch placed on the right signal lever (representing the input H).

Figure 2B:
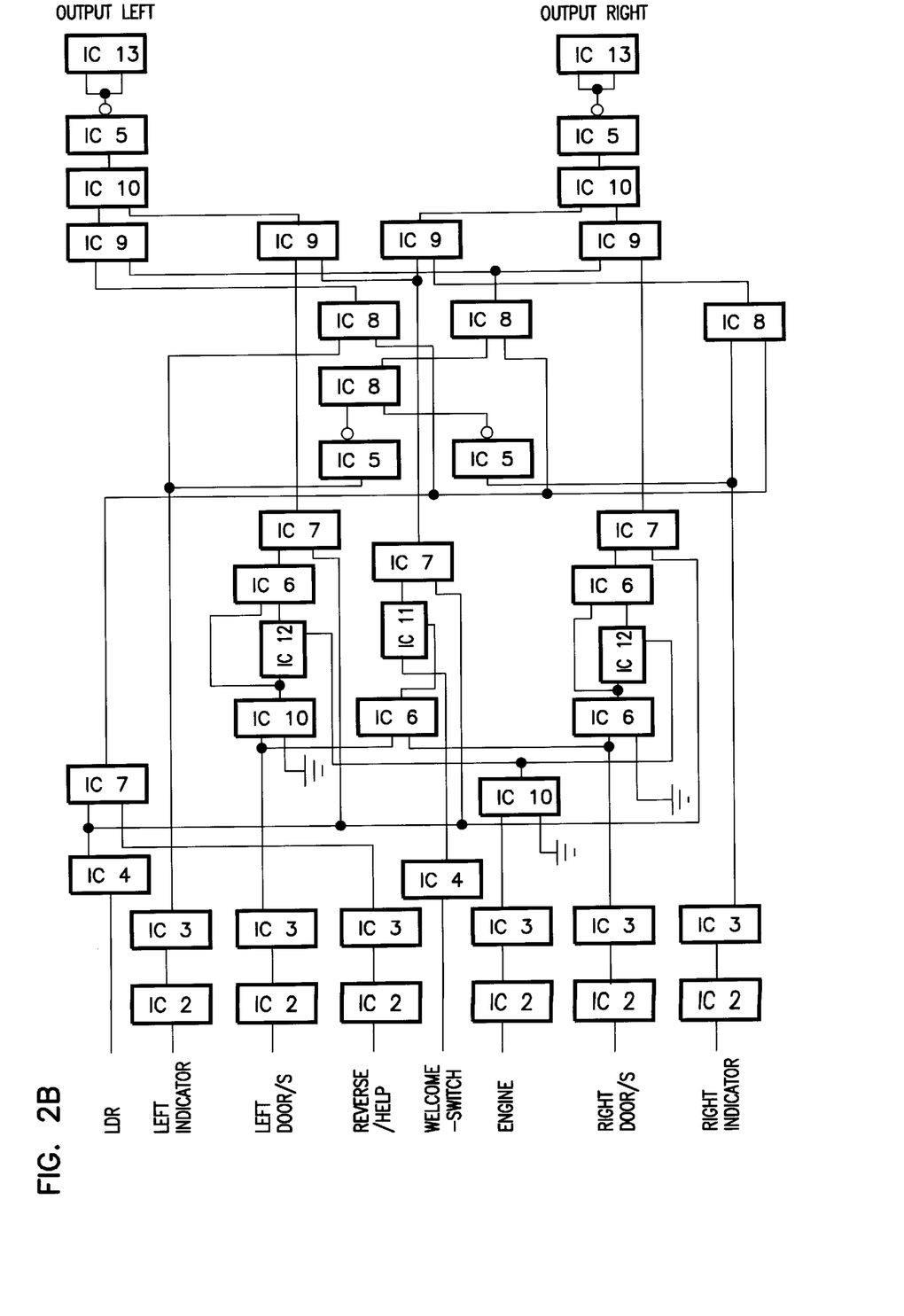

These eight signal inputs together with various ICs are clearly indicated in the system circuit diagram in FIG. 2a and logic diagram in FIG. 2b. The reverse and HELP switches are placed in parallel. Except for the WELCOME and HELP switches, all the inputs can be connected to the existing switches available in a vehicle with some modification.

Figure 3A:
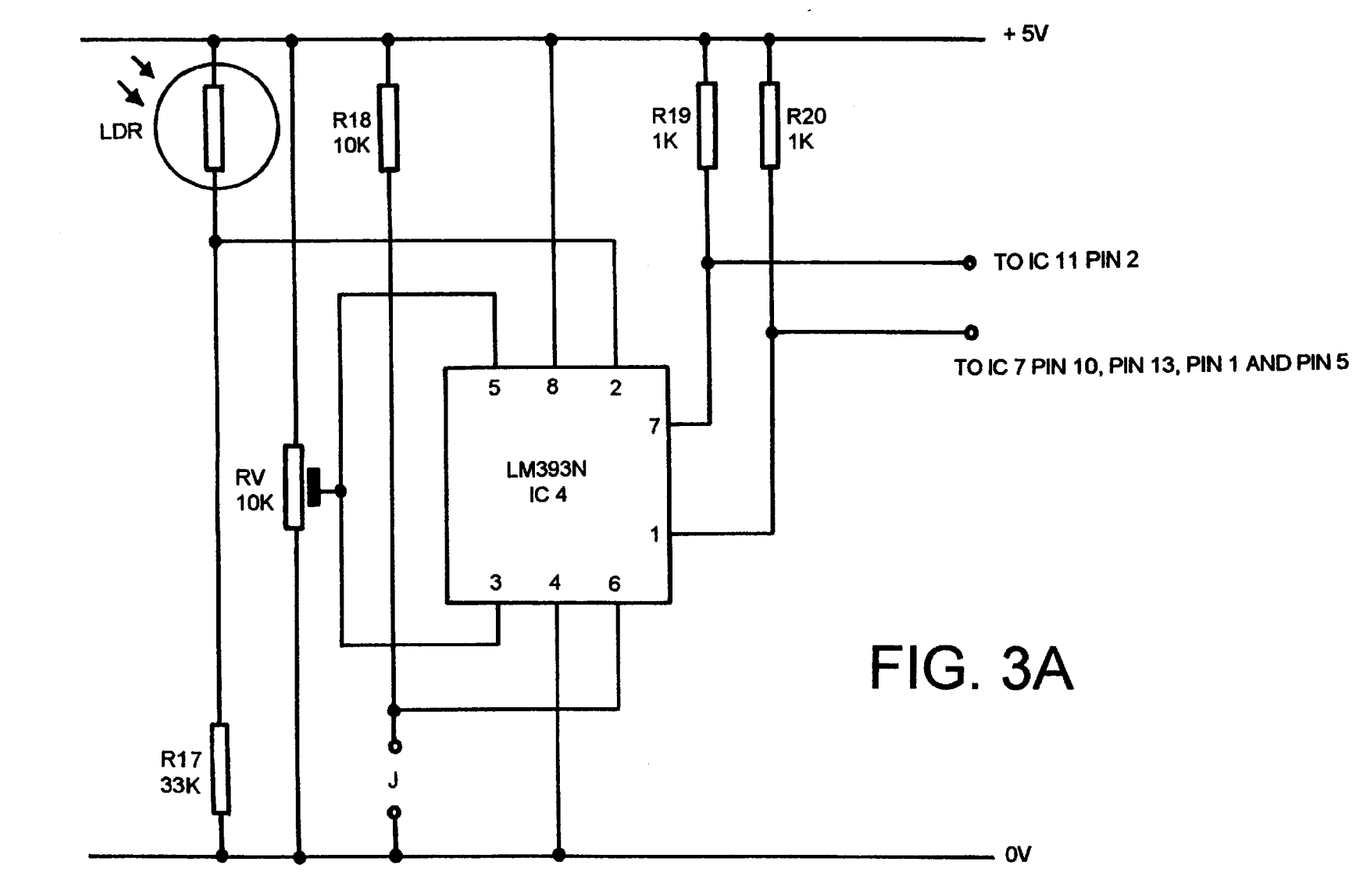

As shown in FIG. 3a, and IC 4 (type LM393N) is employed as a comparator to the light dependent resistor (LDR) signal and the input J (that is whenever the door knob in the centrally locking door, which is usually the right front door, is changed from a locked position to an unlocked position). The IC device operates in an open-loop configuration. The output voltage can thus be in one of the two states, i.e. either nearly equal to that of a negative supply or a positive supply. In this case, the values are +5V or 0V. A resistor Rv with pre-set value is connected to the comparator non-inverting input pin 3 and pin 5 to provide the reference voltage. The voltage on the inventing input (pin 2) is determined by the LDR and the R17 (forming a potential divider). When the amount of the light level falls, the resistance in the LDR increases and the pin 2 input voltage will go lower. When the input voltage on pin 2 drops below the reference voltage, output pin 1 will go high. This arrangement forms a light operated switch. With a pull up resistor R20, the output will give a logic [1] state to TTL logic gate inputs (IC 7 pin 10, pin 13, pin 1 and pin 5). The voltage on pin 6 will go low whenever the right front door magnetic switch is closed. The output pin 7 is pulled up by a resistor R19, and the output is used to trigger the WELCOME timer (IC 11).

Figure 3B:
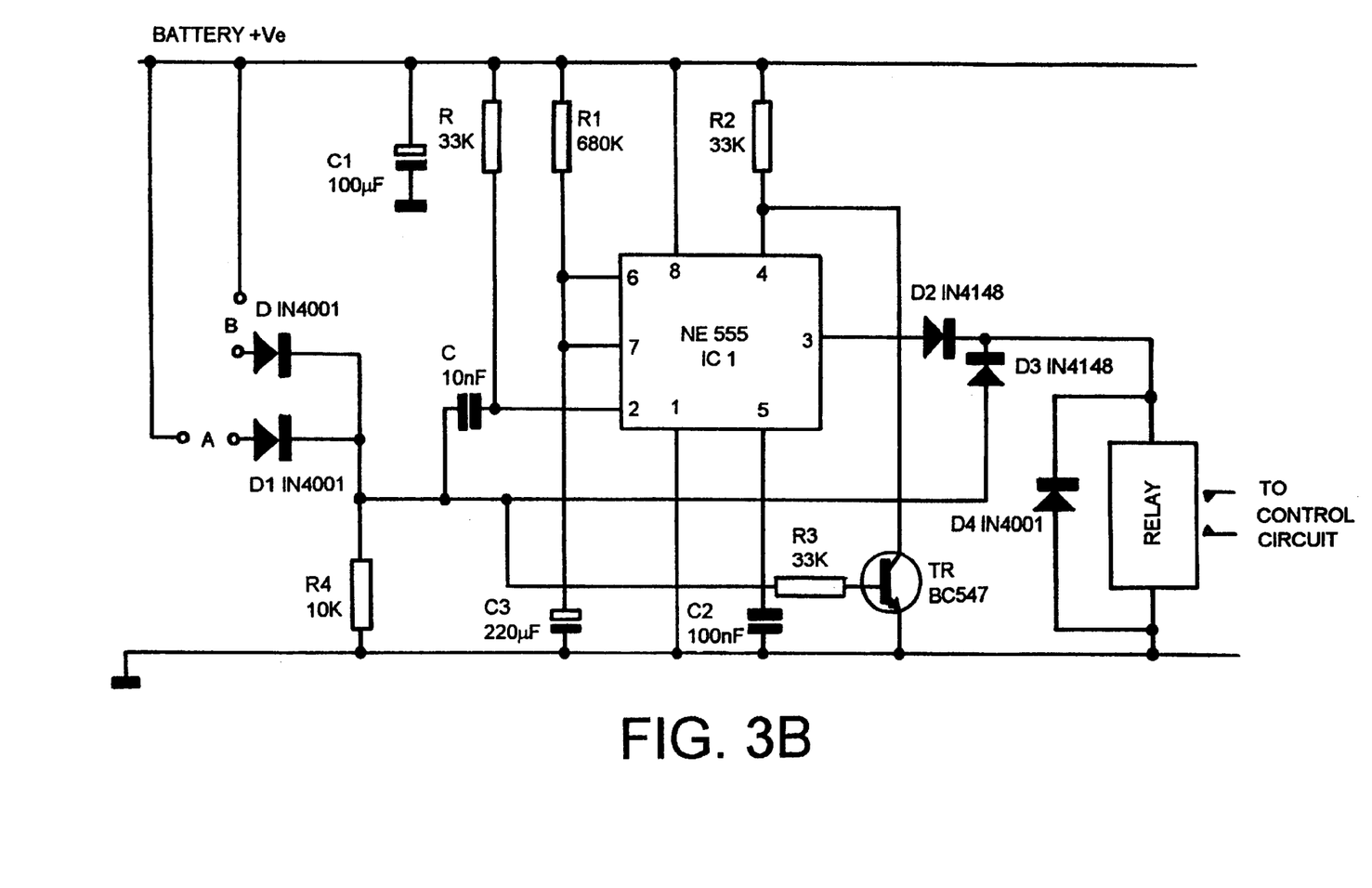

The Applicant would like to explain the working of the supply circuit, referring to FIG. 3b. The supply circuit will be activated to supply current to the control circuit, whenever the ignition key is switched on or when the left front door is unlocked. The supply circuit will automatically cut off after an extended time period of approximately 180 seconds from the last off-state input. During the extended time period, the timer will be de-activated whenever the ignition key is switched on again or when the left front door is unlocked.

To effect an input from the engine, whenever switching the ignition key, a logical ON state is maintained as long as the engine is switched on. This is because all doors should be closed and locked, while the vehicle is in motion.

To effect an input from a door, a small normally closed (NC) magnetic switch is fitted next to the door knob of the left front door. A small magnet is fitted on the door knob. When the door is unlocked, the door knob moves up and the magnetic switch will be closed and a current flows through, giving an ON state to the door input in the supply circuit. When the door is locked, the NC switch opens, no current is allowed to flow, and a logical OFF state is resulted to the door input in the supply circuit.

The diodes D1 and D2 form an OR gate. Any of the above inputs either from the door or the ignition key will give an ON state or a logic [1] output. Pin 4 is held low by the transistor TR below a reset value. A relay coil is energised and a contact switches on the current supply to the control circuit. When both the inputs are switched off, the collector of TR releases pin 4 causing it to go high to Vcc. A negative trigger pulse on pin 2 will start an extension time period. The output pin 3 will go high and the relay coil is energised. The pin 7 will release C3 and allow it to charge towards Vcc with the assistance from R1. When the voltage on C3 reduces to ⅔ Vcc, the pin 6 will trigger and terminate the extension time period. The relay coil is de-energised, the contact is opened, and no current is supplied to the control circuit. During the extension time period, and [1] input from the door or the ignition key will reset the timer. When the resistance is set to 680 K ohms, and the capacitance set to 220 microfarads, the extension time period is calculated to be approximately 165 seconds. But due to the actual value of electrolytic capacitors being greater than the stated value, the extension time period will be approximately 3 minutes.

Now, the Applicant would like to explain the working of the control circuit. The control circuit comprises ICs and other components and would perform the four illumination modes. The method of illumination comprises a first illumination mode on either or both sides whenever a car door is opened. The first illumination mode is equipped with a timer feature. A second illumination mode is activated when the car is reversing. A third illumination mode is activated on both sides of the car, whenever the centrally locking door is changed from a locked position to an unlocked position. The third illumination mode is equipped with a timer feature. A fourth illumination mode is activated on either or both sides whenever a switch on the dashboard is selected.

In a first illumination mode, whenever a car door is opened as in the case of a passenger is entering the car, the left and right lights will individually be lit depending on which door is opened. When the last door is closed with the engine running, the illumination is switched off. The assumption is that the vehicle is about to move and all passengers are inside the vehicle. Where passengers are alighting the vehicle when it is not yet started, and side light should be on. The minute the engine is switched on, the side illumination is not required. It should be noted that the side illumination is provided with a timer feature. When the engine is switched off, the passengers begin to leave the car. The side illumination will be switched off by the timer after an extension time period of approximately 20 seconds, from the moment the last door is closed. This first illumination mode is operational independently when the left or right doors are individually opened whence one side illumination is effected, or opened together whence two side illuminations are effected.

Figure 3C:
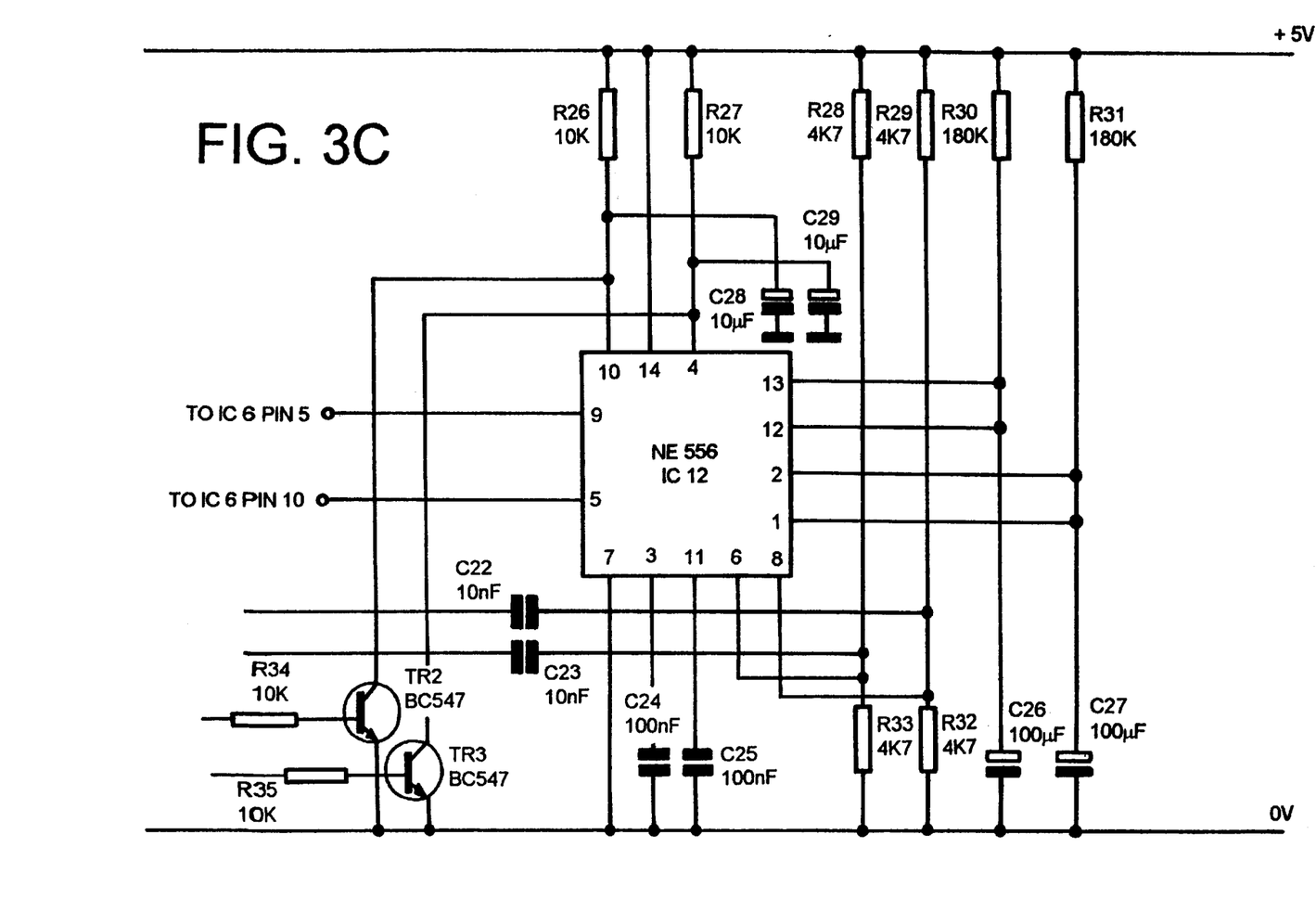

As seen in FIG. 3c, the first illumination mode is essentially controlled by IC 12 (type NE556), IC 10 (type 74LS32) and IC 6 (type 74LS32). When the engine is switched off, the pin 4 and pin 10 of IC 12 will be released, causing them to go high to Vcc, so that the left door or the right door timer is ready for operation.

To operate the left door timer feature, a negative pulse produced by IC 10 pin 6 output is effected when the left door changes from an open to a closed position, that is from logic state [1] to [0]. The extension time period is initiated. Pin 9 will go high to provide logic state [1] to IC 6 pin 5 input. Pin 13 will release C26 and allow it to charge towards Vcc via the assistance of R30. When the voltage of C26 reaches ⅔ Vcc, pin 12 will trigger and terminate the extension time period. Pin 9 will go low and pin 13 will discharge C26. The output pin 9 will give a logic state [0] to IC 6 pin 5 input. During the extension time period, when the ignition is switched on again, a logic state [1] output from IC 10 pin 8 is effected. The pin 10 will be pulled down by TR2. The timer is reset, giving a logic state [0] to IC 6 pin 5 input.

To operate the right door, a negative pulse produced by IC 6 pin 3 output when the right door changes from an open to a closed position, that is from a logic state [1] to [0]. The extension time period is initiated. Pin 5 will go high to provide a logic state [1] to IC 6 pin 10. Pin 1 releases C27 and allows it to change towards Vcc with the assistance of R31. When the voltage of C27 reaches ⅔ Vcc, pin 2 will trigger and terminate the extension time period. Pin 5 will go low and pin 1 will discharge C27. The output pin 5 will give a logic state [0] to IC 6 pin 10. During the extension time period, when the ignition is switched on again, a logic state [1] output from IC 10 pin 8 is effected. The timer will be reset and the pin 4 will be pulled down by TR3.

Capacitors C28 and C29 connected to pin 10 and pin 4 ensure that the right and left door timers are not operational when the power supply is switched on. With a value of 180 K ohms and 100 microfarads, the extension time period is set to a value of approximately 20 seconds.

In a second illumination mode when the car is reversing, two side illuminations will be activated automatically. The illumination will remain on as long as the reverse gear is in contact with the reverse switch. As an additional feature, left side illumination is effected when the left indicator switch is additionally selected. Alternatively, right side illumination is effected when the right indicator switch is additionally selected.

Figure 3D:
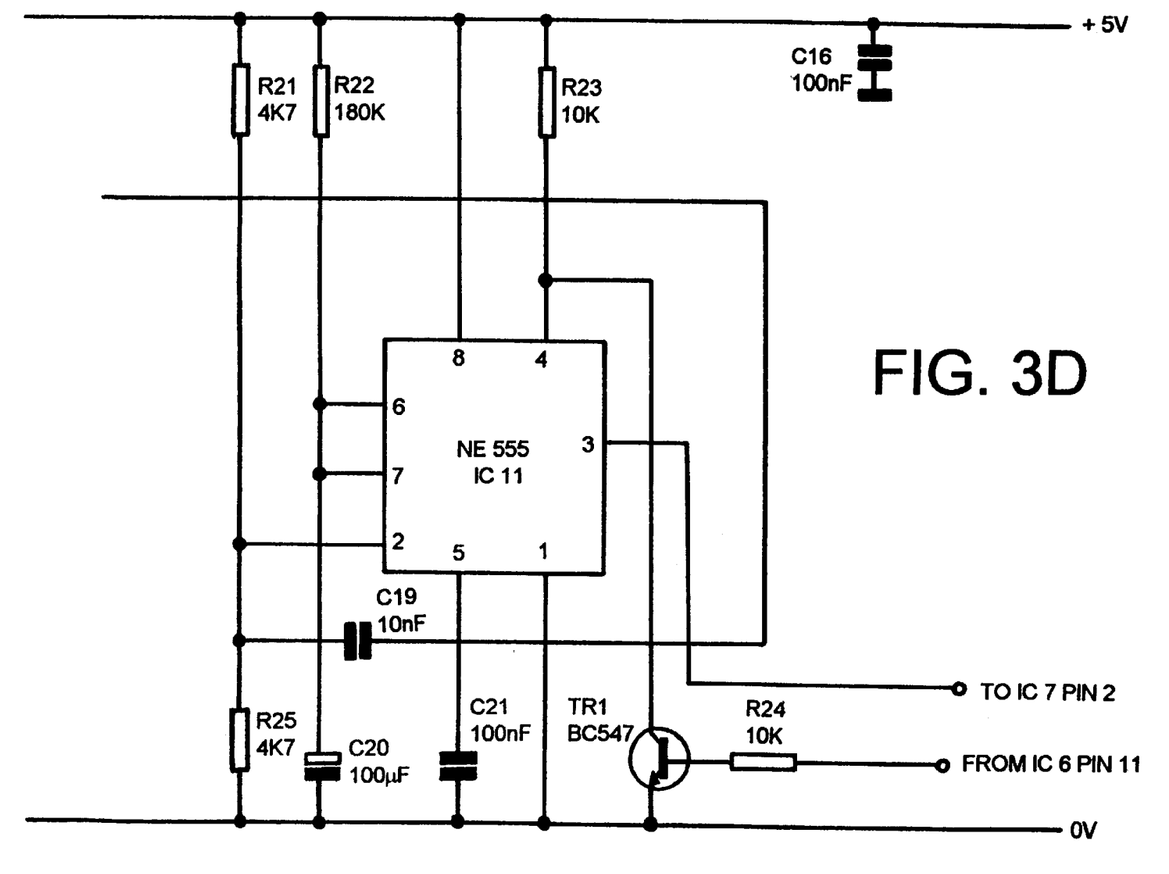
Figure 3E:
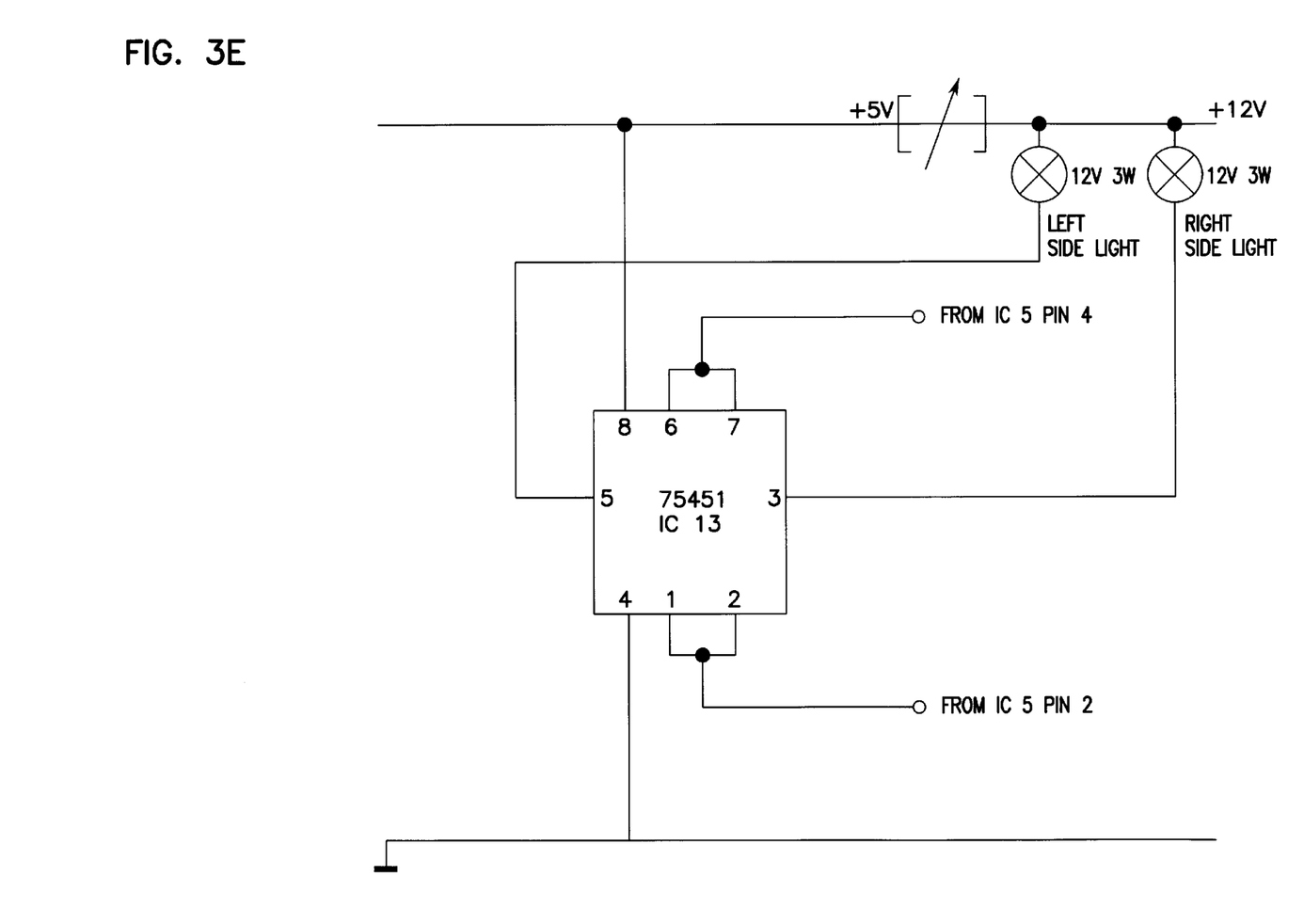

In a third illumination mode, two side illuminations are effected, whenever the door knob in the centrally locking door (which is usually the right front door) is changed from a locked position to an unlocked position. The third illumination mode is controlled by a timer which gives an additional extension time period of approximately 20 seconds. At the end of the time period, the illumination will be switched off. Whenever any door is opened, the timer will be reset. As seen in FIG. 3*d,* IC 11 (type NE555) is employed to achieve the above mentioned function. When the right front door knob is moved from a locked position to an unlocked position, a negative pulse on pin 2 is generated by IC 4 pin 7. The extension time period is initiated with condition that doors on both the left and the right sides are still closed. Pin 3 will go high, giving a logic state [1] to IC 7 pin 2 input. Pin 7 will release C20 and allow it to charge towards Vcc with the assistance of R22. When the voltage on C20 reaches ⅔ Vcc, pin 6 will trigger and terminate the extension time period. Output pin will go low and gives a logic state [0] to IC 7 pin 2. During the extension time period when any door is opened, TR1 will be switched on and pin 4 is pulled down below the reset value. The timer is reset. Output pin gives a logic [0] sate to TTL input (IC 7 pin 2).

In a fourth illumination mode, either or both sides of the vehicle are illuminated, whenever a switch on the dashboard and either the left or the right indicator switch are selected. For an instance, when it is dark, switching on the HELP switch will activate the two side illuminations. Left side illumination is effected when the left indicator switch is additionally selected. Alternatively, the right side illumination is effected when the right indicator switch is additionally selected.

The foregoing is considered as illustrative only. It is not desired to limit the invention to the exact construction, circuits, components and operations shown and described. Numerous modifications and changes are readily available to those skilled in the art, and should be treated as falling within the scope of the invention.

What is claimed is:

1. A method of side illumination for passenger cars is characterized in which the side illumination is activated only when the light level received by a light receiving means is below a pre-set value;

the side illumination is operable in four modes comprising:
a first mode, equipped with a timer feature, operable on either or both sides of the car whenever a car door is opened;
a second mode activated whenever the car is reversing;
a third mode, equipped with a timer feature, activated on both sides of the car, whenever the centrally locking door is changed from a locked position to an unlocked position;
and a fourth mode on either or both sides of the car, activated whenever a switch is selected.

2. A method of side illumination as in claim 1 in which one side light is mounted below and between the front and the rear doors on both sides of the passenger car.

3. A method of side illumination as in claim 2 in which each side light is detachable.

4. A method of side illumination as in claim 1 in which the method is electrically operable by a system circuit connectable to the positive side of the car battery.

5. A method of side illumination as in claim 4 in which the system circuitry comprises a supply circuit which supplies current to a control circuit whenever the car ignition is switched on or when the left front door is unlocked;

and the control circuit which includes essentially several integrated circuits to support the four above mentioned illumination modes.

6. A method of side illumination as in claim 1 in which the timer feature will give an extended time period of at least 20 seconds during the first illumination mode operable on either or both sides of the car whenever a car door is opened.

7. A method of side illumination as in claim 1 in which the timer feature gives an extended time period of at least 20 seconds during the third illumination mode, activated on both sides of the car, whenever the centrally locking door is changed from a locked position to an unlocked position.

8. A method of side illumination as in claim 1 in which the light receiving means is selected from the group including a light dependent resistor (LDR).

\* \* \* \* \*